United States Patent
Kubo

(10) Patent No.: US 10,480,646 B2
(45) Date of Patent: Nov. 19, 2019

(54) CONTROL APPARATUS AND METHOD OF AUTOMATIC TRANSMISSION

(71) Applicant: HONDA MOTOR CO., LTD., Tokyo (JP)

(72) Inventor: Naoyuki Kubo, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/911,348

(22) Filed: Mar. 5, 2018

(65) Prior Publication Data

US 2018/0266546 A1    Sep. 20, 2018

(30) Foreign Application Priority Data

Mar. 16, 2017 (JP) ................. 2017-051653

(51) Int. Cl.
*F16H 61/02* (2006.01)
*F16H 59/72* (2006.01)
*F16H 3/66* (2006.01)
*F16H 3/44* (2006.01)

(52) U.S. Cl.
CPC ......... *F16H 61/0213* (2013.01); *F16H 59/72* (2013.01); *B60Y 2300/186* (2013.01); *B60Y 2300/428* (2013.01); *F16H 3/66* (2013.01); *F16H 2003/445* (2013.01); *F16H 2059/725* (2013.01); *F16H 2061/0241* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC .............. F16H 59/72; F16H 2059/725; F16H 61/0213; F16H 2061/0241
See application file for complete search history.

(56) References Cited

U.S. PATENT DOCUMENTS 5,961,419 A * 10/1999 Hisano ................ F16H 57/0413
184/6.12
8,374,756 B2   2/2013 Sasahara et al.
(Continued)

FOREIGN PATENT DOCUMENTS

JP         2011-027210 A    2/2011

*Primary Examiner* — Edwin A Young
(74) *Attorney, Agent, or Firm* — Thomas | Horstemeyer, LLP

(57) ABSTRACT

A control apparatus of an automatic transmission including a plurality of planetary gear mechanisms and engaging mechanisms configured to establish a gear range by switching inputs/outputs of the plurality of planetary gear mechanisms, comprises an oil pressure supply device which supplies an oil pressure to operate the engaging mechanisms between an engaging state and a release state in which the engaging state is canceled; and a gear change controller which controls an operation state of each of the engaging mechanisms of the planetary gear mechanisms to establish one gear range of a plurality of gear ranges. The gear change controller executes gear change control of restricting the gear change to the gear range in a case in which the temperature of each of the engaging mechanisms in the gear range after the gear change is predicted to be not less than an allowable temperature.

10 Claims, 10 Drawing Sheets

(56) References Cited

U.S. PATENT DOCUMENTS

2013/0078111 A1* 3/2013 Okamoto ............... F04B 49/02
                                                    417/32
2013/0133972 A1* 5/2013 Elliott .................... F16H 61/46
                                                    180/337

* cited by examiner

FIG. 2A

|      | C1 | C2 | C3 | B1 | B2 | B3 | F1 | GEAR RATIO |
|------|----|----|----|----|----|----|-----|-----------|
| RVS  |    |    | ○  |    | ○  |    | ○   | 4.008 |
| 1st  |    |    |    | ○  | ○  |    | △/○ | 5.233 |
| 2nd  |    | ○  |    | ○  | ○  |    | (△) | 3.367 |
| 3rd  |    |    | ○  | ○  | ○  |    | (△) | 2.298 |
| 4th  |    | ○  | ○  | ○  |    |    | (△) | 1.705 |
| 5th  | ○  |    | ○  | ○  |    |    | (△) | 1.363 |
| 6th  | ○  | ○  | ○  |    |    |    | (△) | 1.000 |
| 7th  | ○  |    | ○  |    | ○  |    | (△) | 0.786 |
| 8th  | ○  | ○  |    |    | ○  |    | (△) | 0.657 |
| 9th  | ○  |    |    |    | ○  | ○  | (△) | 0.584 |
| 10th | ○  | ○  |    |    |    | ○  | (△) | 0.520 |
| P/N  |    |    |    |    |    |    | △/○ | — |
| RPM  | ○  |    | ○  | (□)| □  | ○  | △→○ | — |

FIG. 2B

| PLANETARY GEAR MECHANISM | GEAR RATIO |
|--------------------------|------------|
| P1 | 2.681 |
| P2 | 1.914 |
| P3 | 1.614 |
| P4 | 2.734 |

F I G. 4A
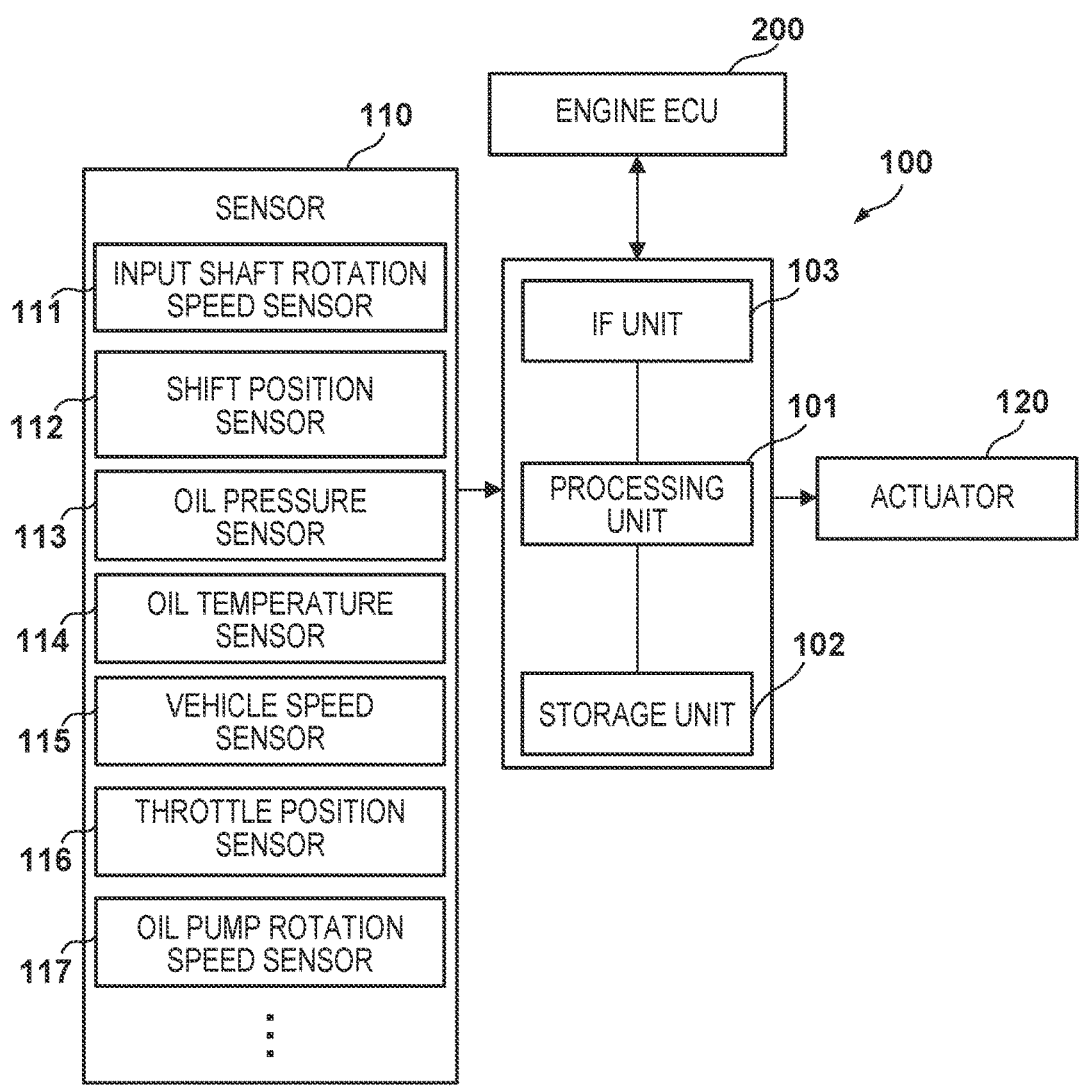

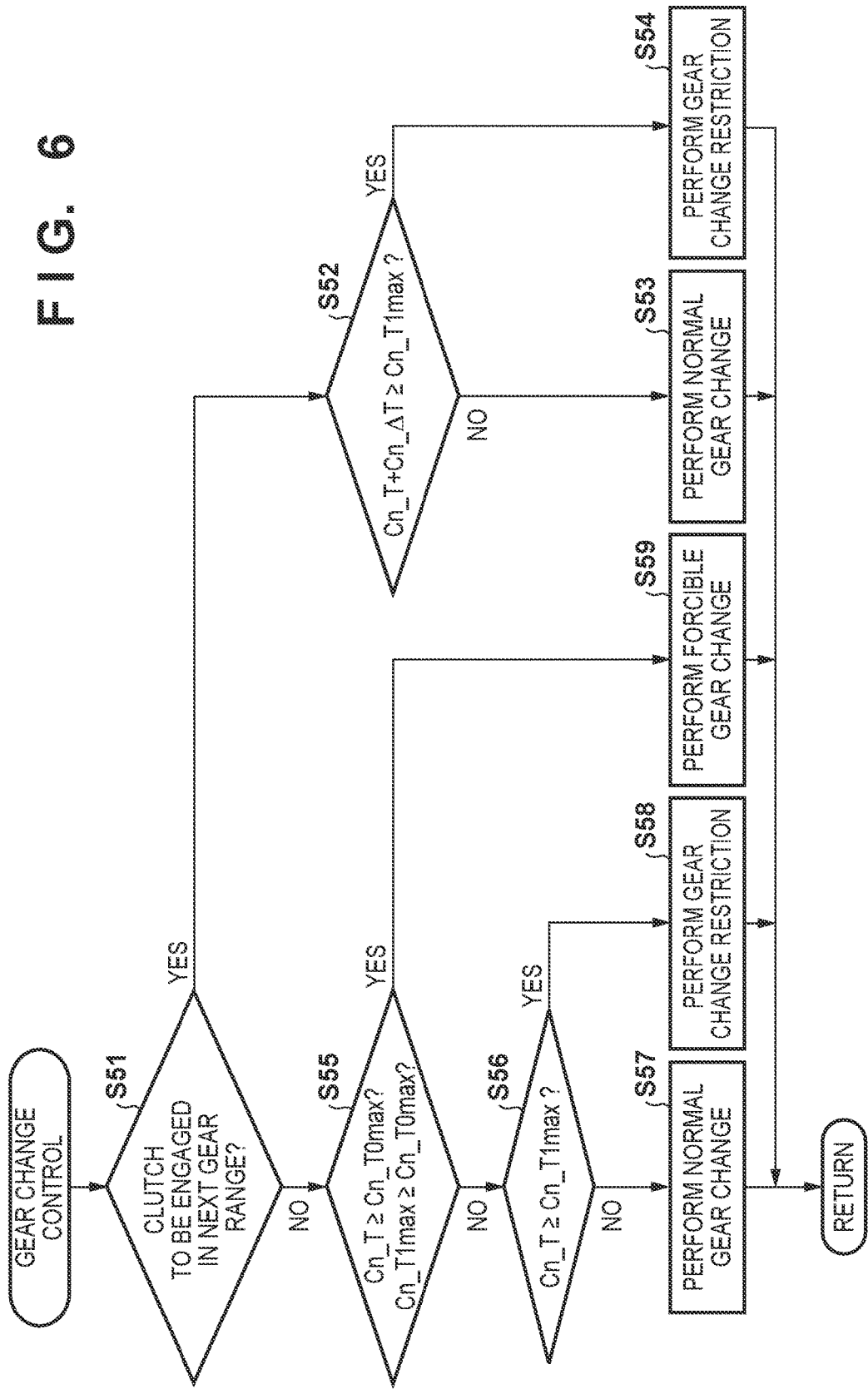

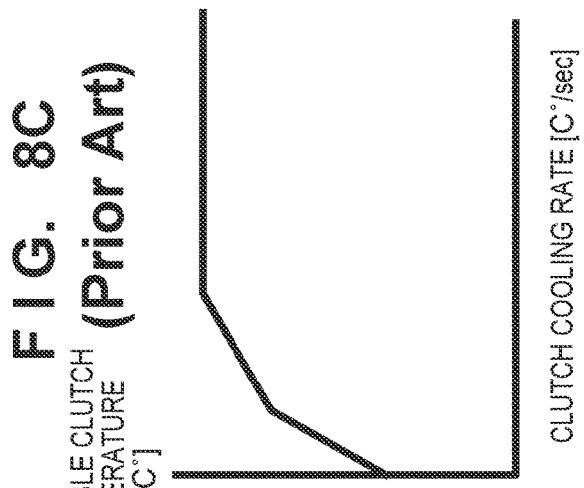
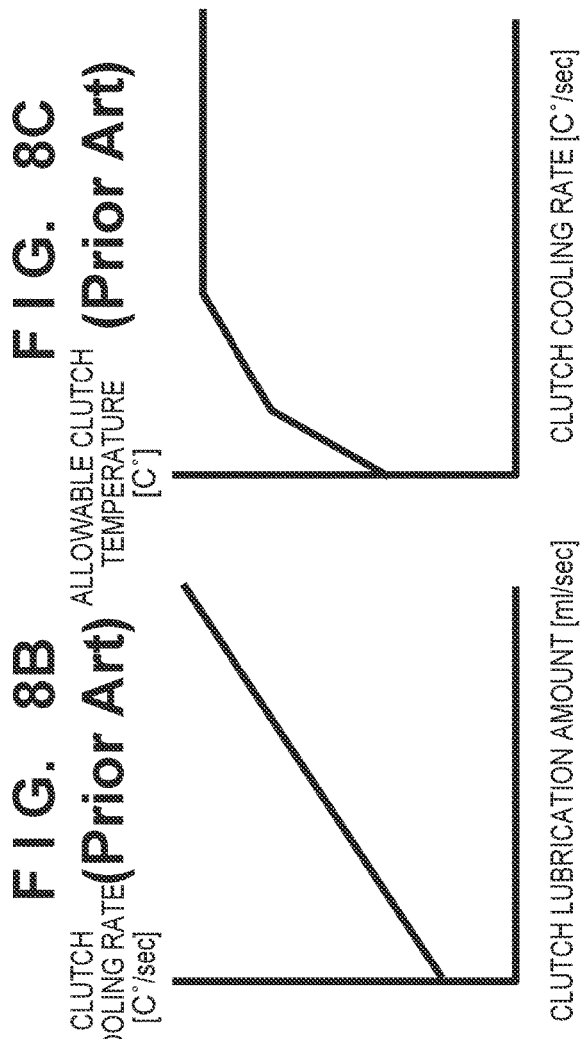
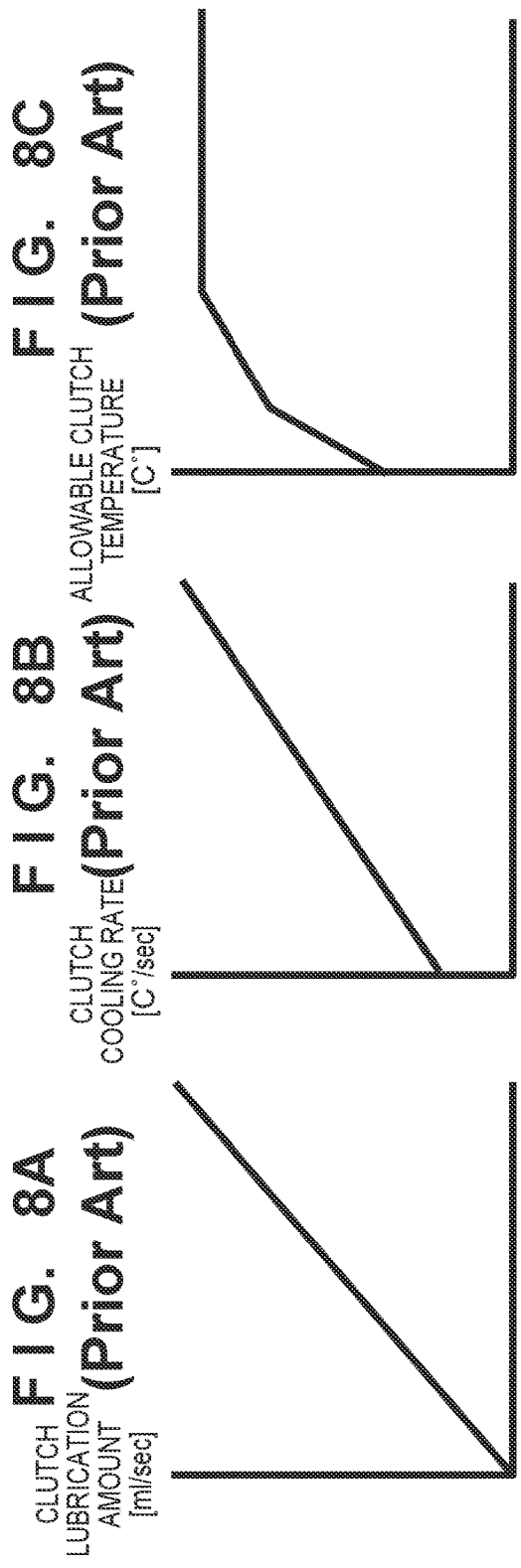
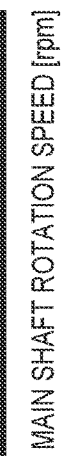
FIG. 8A (Prior Art)
FIG. 8B (Prior Art)
FIG. 8C (Prior Art)
FIG. 8D (Prior Art)

CONTROL APPARATUS AND METHOD OF AUTOMATIC TRANSMISSION

BACKGROUND OF THE INVENTION

Field of the Invention

The present invention relates to clutch protection control of an automatic transmission.

Description of the Related Art

Japanese Patent Laid-Open No. 2011-27210 discloses clutch protection control that controls the engagement of a clutch to a permission state, a partial permission state, or an inhibition state based on the temperature, cooling rate, and heat generation amount of the clutch at the time of gear change of an automatic transmission. In a conventional automatic transmission in which input and output shafts (a main shaft and a counter shaft) are arranged in parallel, the clutch lubrication amount and the main shaft rotation speed hold an almost proportional relationship, as shown in FIG. 8A, and the clutch lubrication amount and the clutch cooling rate hold an almost proportional relationship, as shown in FIG. 8B. That is, as shown in FIGS. 8C and 8D, the main shaft rotation speed can generally be regarded as an alternative parameter of the clutch cooling rate. It is therefore possible to calculate an allowable clutch temperature from the main shaft rotation speed and execute clutch protection control based on the relationship between the clutch temperature and the allowable clutch temperature.

However, since an automatic transmission that establishes a gear range by a plurality of planetary gear mechanisms has a structure in which a plurality of constituent components (sun gears, planetary gears, and ring gears) rotate relative to main shaft rotation, the clutch lubrication amount does not have a simple proportional relationship to the main shaft rotation speed, as shown in FIG. 9A. In addition, even if the input shaft rotation speed remains unchanged, the clutch lubrication amount changes when the gear range changes. Furthermore, as for the cooling rate with respect to the clutch lubrication amount as well, the cooling rate changes in accordance with the operation state (release state/engaging state/guide rotation stop state) of the clutch, as shown in FIG. 9B. For this reason, it is impossible to obtain an allowable clutch temperature suitable for an actual situation from the main shaft rotation speed as in the prior art.

SUMMARY OF THE INVENTION

The present invention has been made in consideration of the aforementioned problems, and realizes, in an automatic transmission that establishes a gear range by a plurality of planetary gear mechanisms, a control technique of the automatic transmission capable of executing protection control by obtaining an appropriate allowable temperature from the cooling rate of an engaging mechanism in a gear range after a gear change.

In order to solve the aforementioned problems, the first aspect of the present invention provides a control apparatus of an automatic transmission including a plurality of planetary gear mechanisms and engaging mechanisms configured to establish a gear range by switching inputs/outputs of the plurality of planetary gear mechanisms, comprising: an oil pressure supply device configured to supply an oil pressure to operate the engaging mechanisms between an engaging state and a release state in which the engaging state is canceled; and a gear change controller configured to control an operation state of each of the engaging mechanisms of the planetary gear mechanisms to establish one gear range of a plurality of gear ranges, wherein the gear change controller calculates a temperature of each of the engaging mechanisms in the gear range after a gear change, calculates a cooling rate of each of the engaging mechanisms in the gear range after the gear change based on the temperature and the operation state of each of the engaging mechanisms, calculates an allowable temperature of each of the engaging mechanisms in the gear range after the gear change based on the cooling rate of each of the engaging mechanisms, and executes gear change control of restricting the gear change to the gear range in a case in which the temperature of each of the engaging mechanisms in the gear range after the gear change is predicted to be not less than the allowable temperature.

In order to solve the aforementioned problems, the second aspect of the present invention provides a control method of an automatic transmission including: a plurality of planetary gear mechanisms and engaging mechanisms configured to establish a gear range by switching inputs/outputs of the plurality of planetary gear mechanisms; an oil pressure supply device configured to supplying an oil pressure to operate the engaging mechanisms between an engaging state and a release state in which the engaging state is canceled; and a gear change controller configured to control an operation state of each of the engaging mechanisms of the planetary gear mechanisms to establish one gear range of a plurality of gear ranges, the method comprising: calculating a temperature of each of the engaging mechanisms in the gear range after a gear change; calculating a cooling rate of each of the engaging mechanisms in the gear range after the gear change based on the temperature and the operation state of each of the engaging mechanisms; calculating an allowable temperature of each of the engaging mechanisms in the gear range after the gear change based on the cooling rate of each of the engaging mechanisms; and executing gear change control of controlling the gear change to the gear range in a case in which the temperature of each of the engaging mechanisms in the gear range after the gear change is predicted to be not less than the allowable temperature.

According to the present invention, in an automatic transmission that establishes a gear range by a plurality of planetary gear mechanisms, protection control can be executed by obtaining an appropriate allowable temperature from the cooling rate of an engaging mechanism in a gear range after a gear change. It is therefore possible to prevent breakage of an engaging mechanism by heat damage or performance deterioration caused by necessary control intervention.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2A is a view showing an example of the engagement table of the automatic transmission according to the present embodiment;

FIG. 2B is a view showing the gear ratios of planetary gear mechanisms in the automatic transmission according to the present embodiment;

FIG. 4A is a block diagram showing an example of configuration of the control apparatus of the automatic transmission according to the present embodiment;

FIG. 6 is a flowchart showing clutch protection control according to the present embodiment;

FIG. 8A is a view showing the relationship between a main shaft rotation speed and a clutch lubrication amount in a conventional automatic transmission;

FIG. 8B is a view showing the relationship between a clutch lubrication amount and a clutch cooling rate in the conventional automatic transmission;

FIG. 8C is a view showing the relationship between a clutch cooling rate and an allowable clutch temperature in the conventional automatic transmission;

FIG. 8D is a view showing the relationship between a main shaft rotation speed and an allowable clutch temperature in the conventional automatic transmission;

DESCRIPTION OF THE EMBODIMENTS

A control apparatus of an automatic transmission according to an embodiment of the present invention will now be described with reference to the accompanying drawings.

<Overall Structure>

The overall structure of the automatic transmission according to the present embodiment will be described first with reference to FIGS. 1 to 3.

Figure 1:
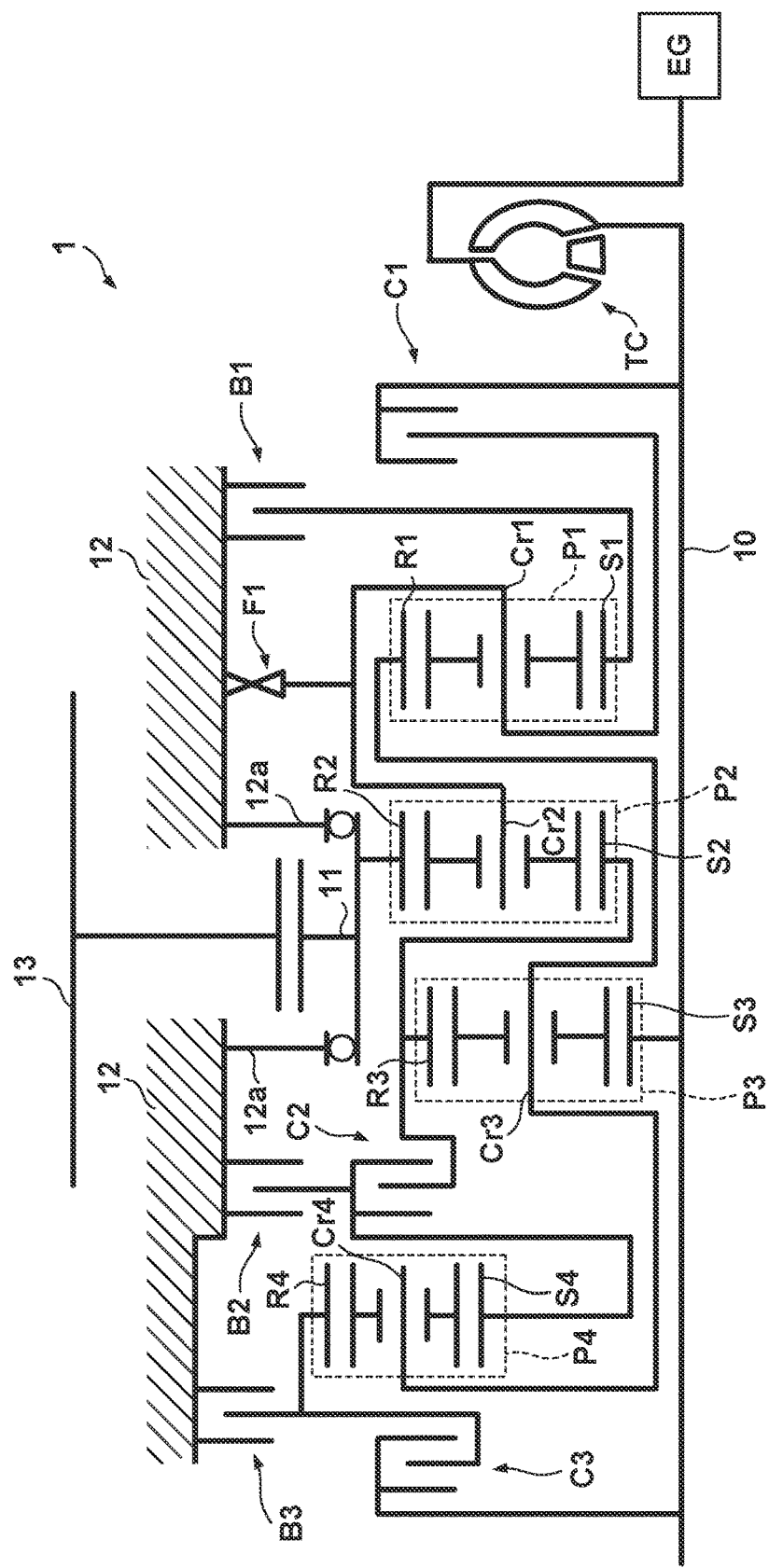
FIG. 1 is a skeleton diagram of an automatic transmission according to the present embodiment.

Referring to FIG. 1, an automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes abbreviated as EG hereinafter) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In the present embodiment, a torque converter TC is provided. Hence, the driving force of the internal combustion engine EG is input to the input shaft 10 via the torque converter TC.

The output member 11 includes a gear concentric to the input shaft 10. The output shaft 13 includes a gear that meshes with the gear. The rotation of the input shaft 10 changes its speed via transmission mechanisms to be described below and is then transmitted to the output shaft 13. The rotation (driving force) of the output shaft 13 is transmitted to driving wheels via, for example, differential gears (not shown).

As the transmission mechanisms, the automatic transmission 1 includes planetary gear mechanisms P1 to P4 and engaging mechanisms C1 to C3, B1 to B3, and F1. In the present embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In the present embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state (disengaging state), and the state of the engaging mechanism F1 is switched, the driving force transmission path from the input shaft 10 to the output member 11 is switched, and the plurality of gear ranges are implemented.

In the present embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC hereinafter) in which the rotation of the predetermined rotational elements (carriers Cr1 and Cr2) is restricted only in one direction, and rotation in the reverse direction is permitted and a rotation inhibition state (to be sometimes referred to as TWC hereinafter) in which rotation is restricted in both directions.

In the one-way rotation permission state, the same function as a so-called one-way clutch is implemented. In this state, the rotational elements transmit the driving force in one rotation direction but slip in the reverse direction. In the present embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In the present embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

As the engaging mechanism F1, for example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In the present embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In the present embodiment, ten forward speeds (1st to 10th) and one reverse speed (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engaging table shown in FIG. 2A, "o" indicates the engaging state, and no mark indicates the release state. In "RPM", "▫" represents that the engaging mechanism is set in a semi-engaging state (brake B2), "(▫)" represents that the engaging mechanism is set in a semi-engaging state or a release state (brake B1).

Note that there are included engaging mechanisms that are set in the engaging state for smooth change to adjacent gear ranges, although the engagement is not essential to establish the gear ranges. For example, in the first-speed gear (1st), engagement of the brake B2 is not essential. However, when changing to the reverse-speed gear (RVS) or second-speed gear (2nd), the brake B2 is set in the engaging state for the purpose of decreasing the engaging mechanisms to switch the engaging state. Similarly, in the fifth-speed gear (5th), engagement of the clutch C3 is not essential. However, when changing to the fourth-speed gear (4th) or sixth-speed gear (6th), the clutch C3 is set in the engaging state for the purpose of decreasing the engaging mechanisms to switch the engaging state.

As for the brake F1, "o" indicates the rotation inhibition state, and "Δ" indicates the one-way rotation permission state. In the first-speed gear (1st), the brake F1 can be set in either the rotation inhibition state or the one-way rotation permission state. In the rotation inhibition state, the engine brake is enabled. In the one-way rotation permission state, the engine brake does not work. An algorithm to determine which state is set for the brake F1 in the first-speed gear (1st) can appropriately be designed. For example, the state before a change to the first-speed gear (1st) may be inherited. More specifically, when changed from the reverse range (RVS) to the first-speed gear (1st), the brake F1 remains in the rotation inhibition state in the first-speed gear (1st). However, if, for example, the vehicle speed exceeds a predetermined speed, the brake F1 may be switched to the one-way rotation permission state. Similarly, when changed from other forward ranges (2nd to 10th) to the first-speed gear (1st), the brake F1 remains in the one-way rotation permission state in the first-speed gear (1st).

In the non-running ranges (P/N) as well, the state of the brake F1 can be either the rotation inhibition state or the one-way rotation permission state. Hence, the state before a change to the non-running ranges (P/N) may be inherited, as in the first-speed gear (1st).

In the second-speed gear (2nd) to the tenth-speed gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the second-speed gear (2nd) to the tenth-speed gear (10th).

Note that in the present embodiment, the one-way rotation permission state is selected as the state of the brake F1 in each of the second-speed gear (2nd) to the tenth-speed gear (10th). However, a configuration that selects the rotation inhibition state can also be employed depending on the configuration of the automatic transmission 1.

Figure 3:
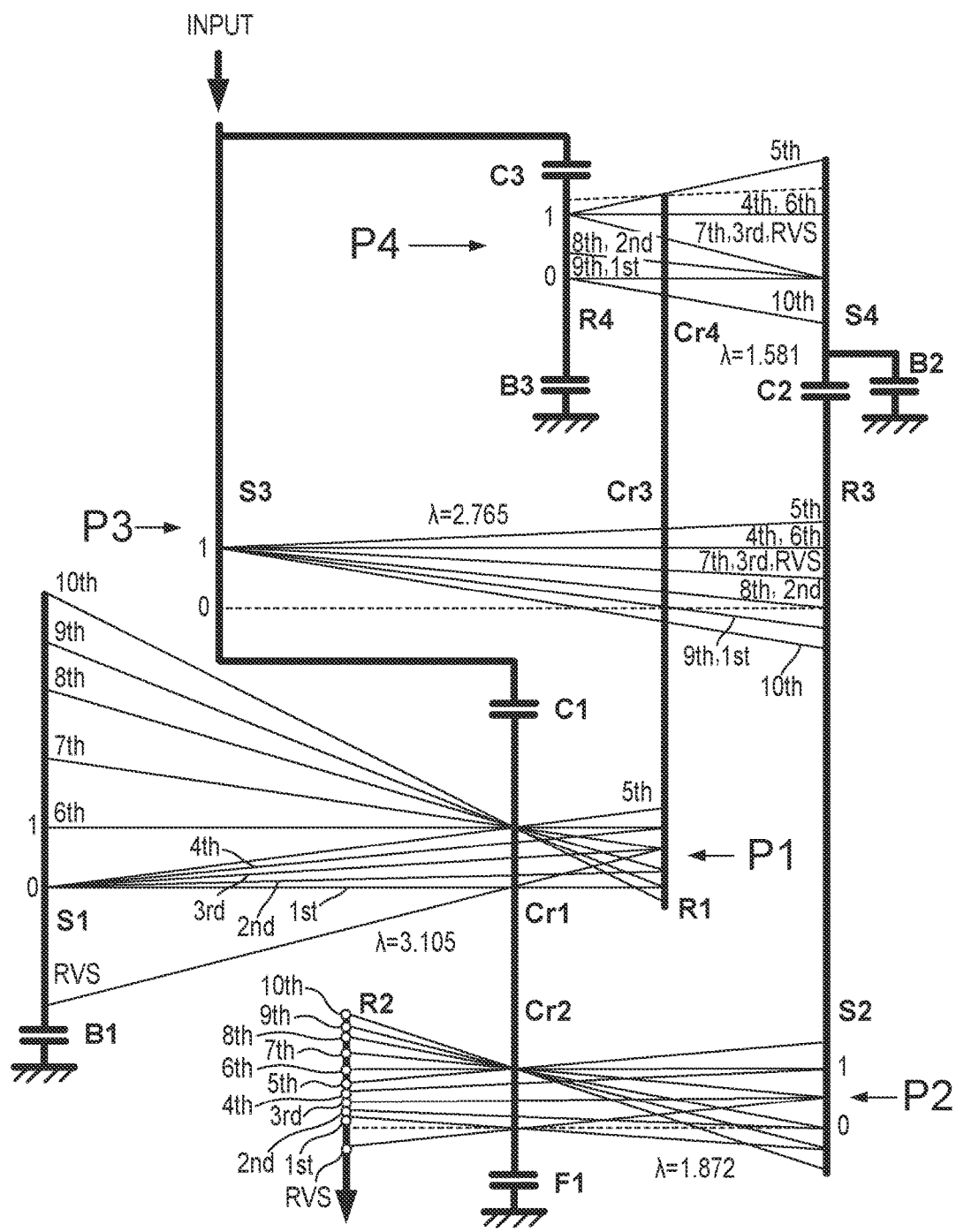
FIG. 3 is a velocity diagram of the automatic transmission according to the present embodiment.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Configuration of Control Apparatus>

The configuration of a control apparatus 100 of the automatic transmission 1 according to the present embodiment will be described next with reference to FIGS. 4A to 4C.

Figure 4B:
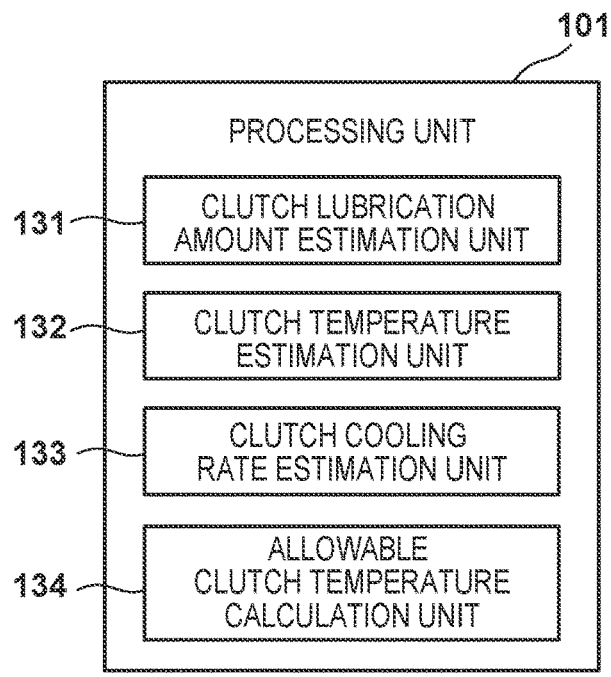
FIG. 4B is a functional block diagram of the processing unit of the control apparatus of the automatic transmission according to the present embodiment.

FIG. 4A is a block diagram of the control apparatus 100 of the automatic transmission 1, and FIG. 4B is a functional block diagram of a processing unit 101 of the control apparatus 100. The control apparatus 100 can control not only the automatic transmission 1 but also the internal combustion engine EG and the torque converter TC. In the present embodiment, however, the internal combustion engine EG is assumed to be controlled by an engine ECU 200 provided separately from the control apparatus 100. The control apparatus 100 can receive various kinds of information of the internal combustion engine EG and the vehicle from the engine ECU 200. In addition, the control apparatus 100 can transmit the information of the automatic transmission 1 to the engine ECU 200.

The control apparatus 100 includes the processing unit 101 such as a CPU, a storage unit 102 such as a RAM and ROM, and an IF unit 103 that interfaces between the processing unit 101 and an external device or the engine ECU. The IF unit 103 is formed from, for example, a communication interface or an input/output interface.

The processing unit 101 executes a program stored in the storage unit 102 and controls various kinds of actuators 120 based on the detection results of various kinds of sensors 110. The storage unit 102 stores a program used for clutch protection control to be described later with reference to FIGS. 5 and 6 and maps shown in FIGS. 7A to 7D.

The various kinds of sensors 110 include various kinds of sensors provided in the automatic transmission 1. FIG. 4A illustrates the following sensors.

An input shaft rotation speed sensor 111 is a sensor that detects the rotation speed of the input shaft 10. An SP sensor (shift position sensor) 112 is a sensor that detects a shift position selected by the driver. In the present embodiment, four types of shift positions, that is, P range (parking range), D range (forward range), N range (neutral range), and R range (reverse range) are assumed as the shift positions. If the D range is selected, the processing unit 101 selects one of the first-speed gear (1st) to the tenth-speed gear (10th) in accordance with a gear change map stored in the storage unit 102 and changes the gear. If the R range is selected, the processing unit 101 selects the reverse range.

An oil pressure sensor 113 includes sensors that detect the oil pressures of hydraulic oils in the engaging mechanisms C1 to C3 and B1 to B3. An oil temperature sensor 114 includes sensors that detect temperatures ATF_T of the hydraulic oils in the engaging mechanisms C1 to C3 and B1 to B3. A vehicle speed sensor 115 is a sensor that detects the traveling speed of the vehicle in which the automatic transmission 1 is mounted. A throttle position sensor 116 is a sensor that detects the throttle valve opening of the engine corresponding to the depression of the accelerator pedal. An oil pump rotation speed sensor 117 is a sensor that detects a rotation speed P_N of an oil pump 121 that supplies hydraulic oil to a supply line L of each engaging mechanism shown in FIG. 4C.

The processing unit 101 calculates a gear range from the velocity diagram of FIG. 3 based on the vehicle speed detected by the vehicle speed sensor 115 and the throttle valve opening detected by the throttle position sensor 116.

In addition, as shown in FIG. 4B, the processing unit 101 includes functional blocks associated with clutch protection control according to the present embodiment.

Figure 7A:
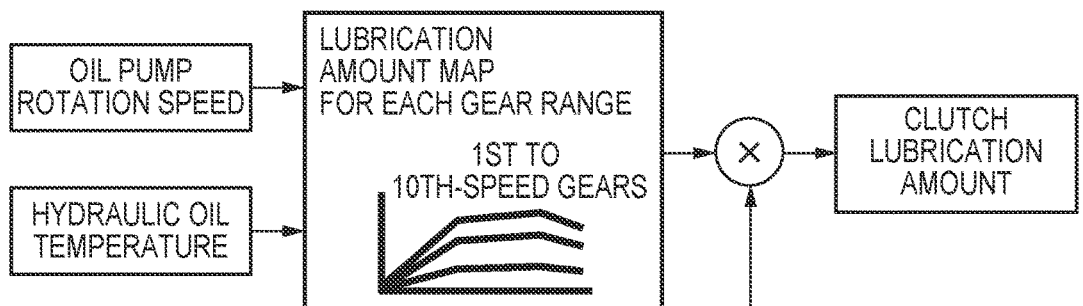
FIG. 7A is a view showing an example of a map used to calculate a clutch lubrication amount in FIG. 5.
Figure 7B:
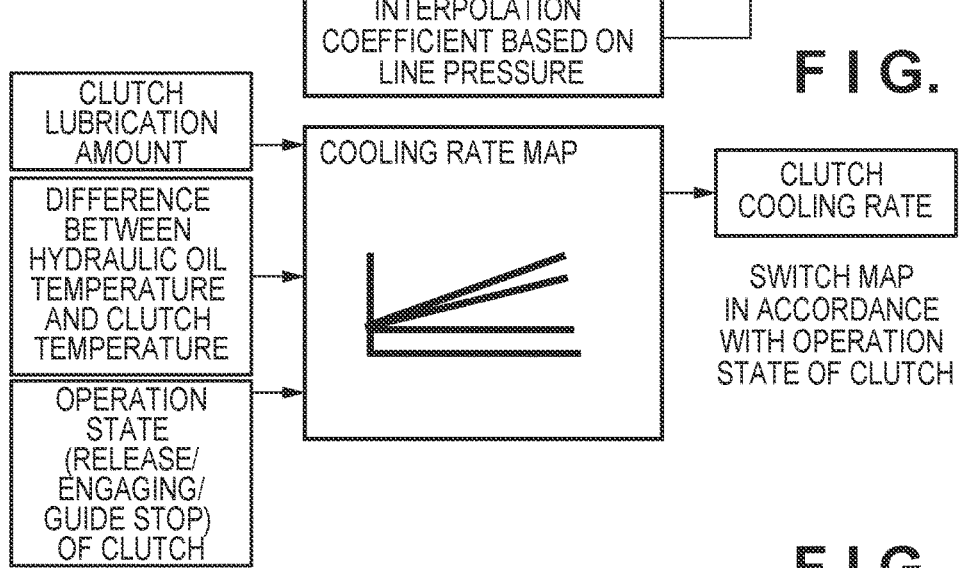
FIG. 7B is a view showing an example of a map used to calculate a clutch cooling rate in FIG. 5.
Figure 7C:
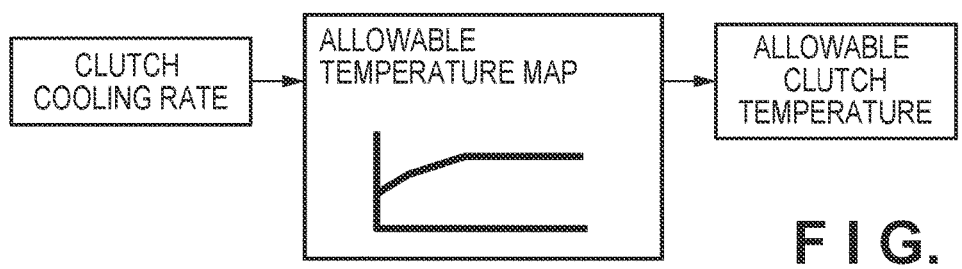
FIG. 7C is a view showing an example of a map used to calculate an allowable clutch temperature in FIG. 5.

A clutch lubrication amount estimation unit 131 calculates a lubrication amount C_CL of each of the clutches C1 to C3 from the oil pump rotation speed P_N and the hydraulic oil temperature ATF_T. The clutch lubrication amount [ml/sec] represents a state quantity representing the degree of lubrication (cooling) of the clutch by the hydraulic oil. As shown in FIG. 7A, the clutch lubrication amount C_CL is calculated by multiplying a value obtained for each gear range based on the oil pump rotation speed P_N and the hydraulic oil temperature ATF_T by an interpolation coefficient based on the line pressure of the supply line L.

A clutch temperature estimation unit 132 calculates an estimated temperature value C_T of each of the clutches C1 to C3 in the current gear range and a predicted raised temperature value C_ΔT of each of the clutches C1 to C3 in a gear range after a gear change (speed change). As a detailed method of calculating the estimated temperature value [° C.] of a clutch (to be referred to as a clutch temperature hereinafter), a known method described in Japanese Patent Laid-Open No. 2008-101705 or the like is used. The calculation method of the clutch temperature C_T will briefly be described here.

An amount ΔQ of heat generated by a clutch C per unit time (msec) is given by

ΔQ=clutch torque×dω/dt

Here, clutch torque=(force to press piston by oil pressure+ centrifugal oil pressure−return spring load)×coefficient of kinetic friction×disc coefficient (gear ratio×number of discs)).

Hence, a heat amount Q(t) at time t is

Q(t)=ΣΔQ(t)

Hence, a clutch temperature C_T(t) at time t is given by

C_T(t)=ΣΔQ(t)/(Cp×m)

where Cp is the specific heat of a clutch plate, and m is the weight of the clutch plate.

Figure 7D:
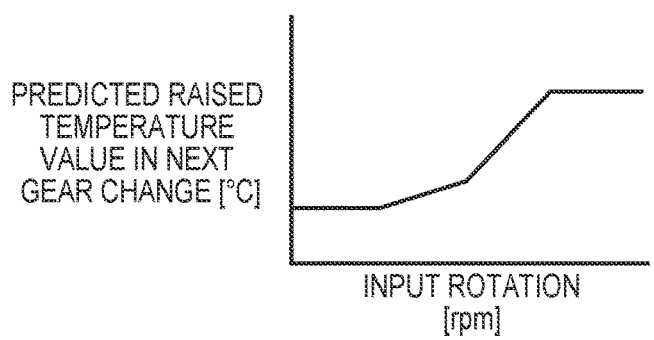
FIG. 7D is a view showing an example of a map used to calculate a predicted raised temperature value in FIG. 5.
Figure 9A:
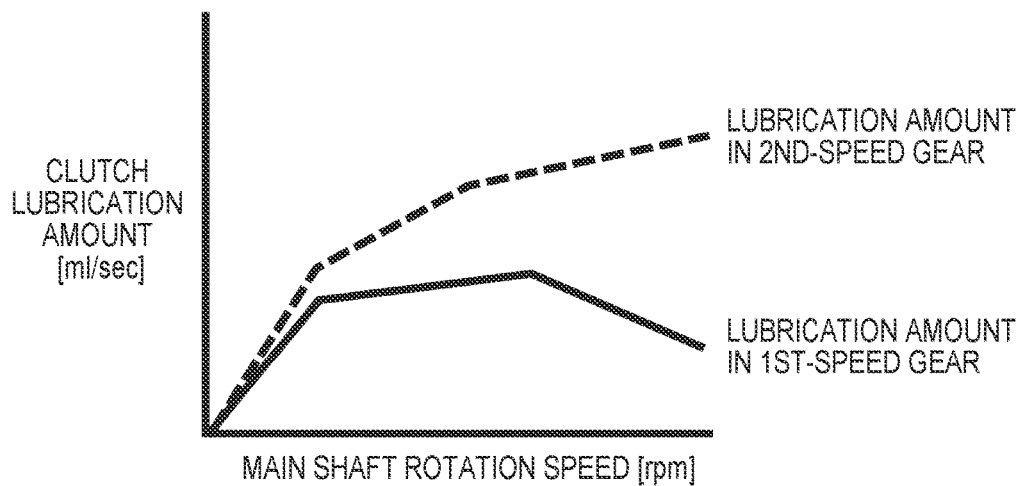
FIG. 9A is a view showing the relationship between a main shaft rotation speed and a clutch lubrication amount in the automatic transmission according to the present embodiment.
Figure 9B:
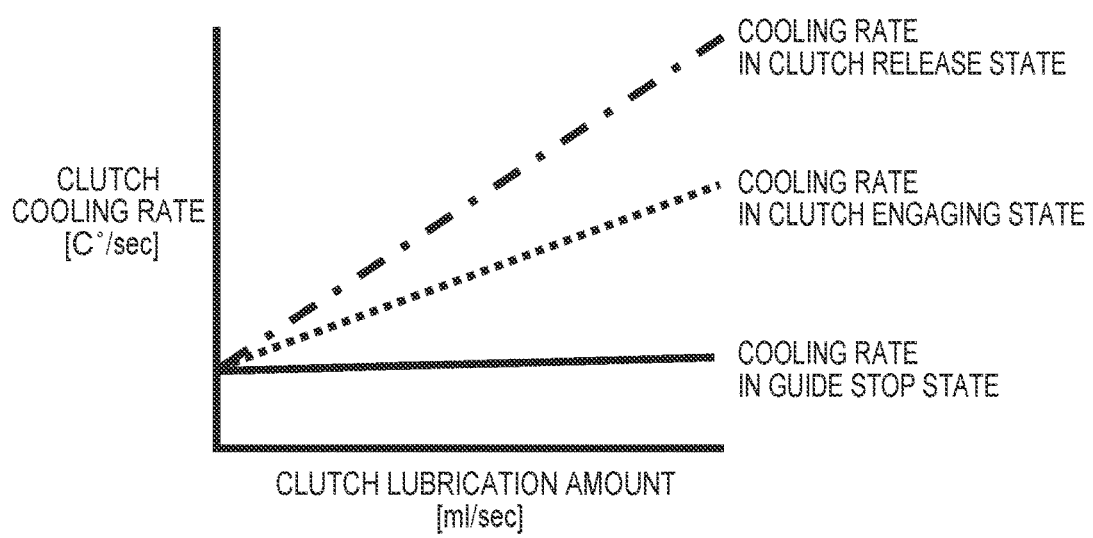
FIG. 9B is a view showing the relationship between a clutch lubrication amount and a clutch cooling rate in the automatic transmission according to the present embodiment.

Note that the predicted raised temperature value C_ΔT of the clutch C in the gear range after the gear change is obtained from the map shown in FIG. 7D based on an input rotation speed [rpm] to the clutch C.

A clutch cooling rate estimation unit 133 calculates a cooling rate C_V of each clutch in the current gear range or the gear range after the gear change from the operation state (a release state, an engaging state, or a guide rotation stop state) of each of the clutches C1 to C3, the clutch lubrication amount C_CL of the clutch, and the difference between the clutch temperature C_T in the current gear range and the hydraulic oil temperature ATF_T. The clutch cooling rate [° C./sec] is calculated based on the clutch lubrication amount C_CL and the difference between the clutch temperature C_T and the hydraulic oil temperature ATF_T in the current gear range by switching the map shown in FIG. 7B in accordance with the operation state of the clutch in the current gear range or the gear range after the gear change.

An allowable clutch temperature calculation unit 134 calculates an allowable temperature C_Tmax of a clutch in the current gear range or the gear range after the gear change from the cooling rate C_V of the clutch in the current gear range or the gear range after the gear change. The allowable clutch temperature [° C.] is calculated using the map shown in FIG. 7C with a characteristic that changes in accordance with the clutch cooling rate C_V.

For a clutch to be engaged in the next gear change, if the clutch temperature C_T in the gear range after the gear change is predicted to be equal to or higher than the allowable clutch temperature C_Tmax, the processing unit 101 executes clutch protection control to protect the clutch from heat damage by restricting the gear change (upshift or downshift). Additionally, for a clutch not to be engaged in the next gear change, even if the current clutch temperature C_T is lower than the allowable clutch temperature C_Tmax in the current gear range, if the clutch temperature C_T in the gear range after the gear change is predicted to be equal to or higher than the allowable clutch temperature, the processing unit 101 executes gear change restriction. Furthermore, even in a clutch not to be engaged in the next gear change, if the clutch temperature is already equal to or higher than the allowable clutch temperature, and the clutch cooling rate in the gear range after the gear change becomes higher than the current clutch cooling rate, the processing unit 101 forcibly executes the gear change.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 controls the various kinds of actuators 120.

Figure 4C:
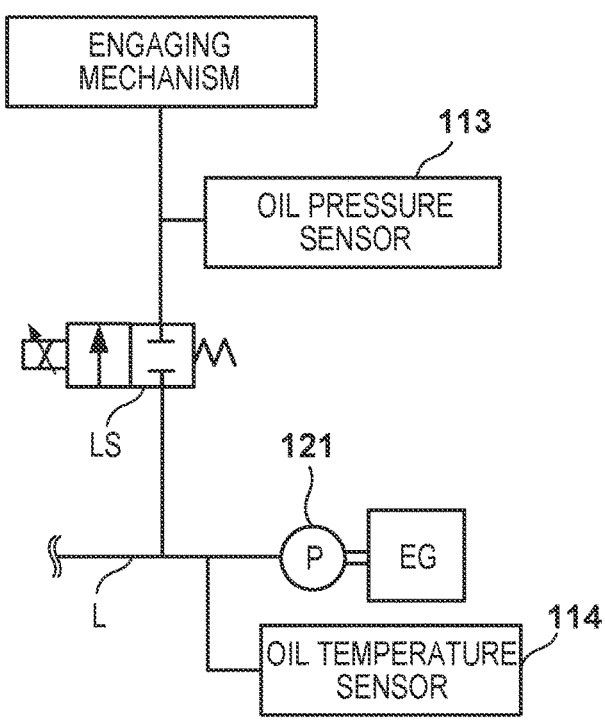
FIG. 4C is a view showing an example of the disposition of sensors in the control apparatus of the automatic transmission according to the present embodiment.

FIG. 4C shows an example of the disposition of the oil pressure sensor 113 and the oil temperature sensor 114. The oil pressure sensor 113 is provided for each of the engaging mechanisms C1 to C3 and B1 to B3, and detects the oil pressure of the hydraulic oil of each engaging mechanism. The oil temperature sensor 114 is provided, for example, near the discharge port of the hydraulic oil from the oil pump 121 to the supply line L, and detects the temperature ATF_T of the hydraulic oil supplied from the oil pump 121 to each engaging mechanism. Note that the configuration of the oil pressure sensor 113 and the oil temperature sensor 114 is not limited to that of the present embodiment.

A solenoid valve LS that supplies the hydraulic oil is assigned to each engaging mechanism. Engagement and release of each engaging mechanism can be switched by opening or blocking the supply line L of the hydraulic oil by the solenoid valve LS. The oil pressure sensor 113 is provided so as to receive the hydraulic oil supplied from the solenoid valve LS to the engaging mechanism. The detection result of the oil pressure sensor 113 indicates the oil pressure of the hydraulic oil supplied to the engaging mechanism. The hydraulic oil is pressure-fed to the supply line L by the oil pump 121 driven by the internal combustion engine EG.

<Clutch Protection Control>

Clutch protection control of the automatic transmission 1 according to the present embodiment will be described next with reference to the block diagrams shown in FIGS. 4A to 4C, the flowcharts shown in FIGS. 5 and 6, and the maps shown in FIGS. 7A to 7D.

In clutch protection control according to the present embodiment, the gear change is restricted when, for a clutch to be engaged in the next gear change, the clutch temperature C_T in the gear range after the gear change is predicted to be equal to or higher than the allowable clutch temperature C_Tmax. Additionally, for a clutch not to be engaged in the next gear change, even if the current clutch temperature C_T is lower than the allowable clutch temperature C_Tmax in the current gear range, if the clutch temperature in the gear range after the gear change is predicted to be equal to or higher than the allowable clutch temperature, the gear change is restricted. Furthermore, even in a clutch not to be engaged in the next gear change, if the clutch temperature is already equal to or higher than the allowable clutch temperature, and the clutch cooling rate in the gear range after the gear change becomes higher than the current clutch cooling rate, the gear change is forcibly executed.

Figure 5:
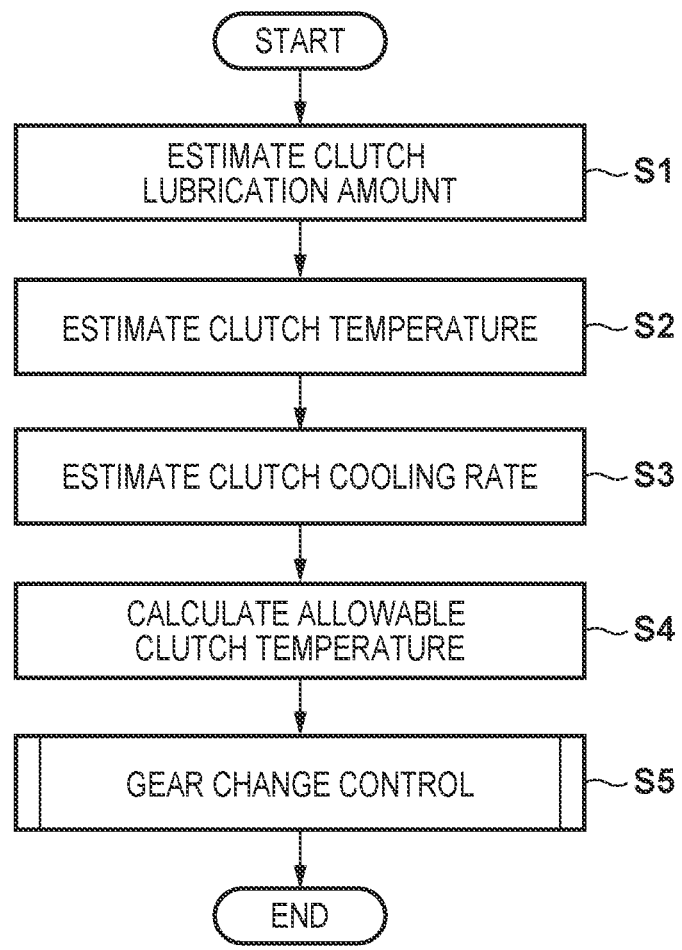
FIG. 5 is a flowchart showing clutch protection control according to the present embodiment.

Note that the flowcharts of FIGS. 5 and 6 are started when the engine EG is started, and are implemented when the CPU of the processing unit 101 of the control apparatus 100 loads a gear change control program, the velocity diagram (FIG. 3), and the maps (FIGS. 7A to 7D) stored in the ROM of the storage unit 102 into the RAM and executes the program for each of the clutches C1 to C3. Here, the gear change control program is a program configured to execute the clutch protection control according to the present embodiment.

In step S1, the processing unit 101 of the control apparatus 100 causes the clutch lubrication amount estimation unit 131 to calculate a clutch lubrication amount Cn_CL for each gear range based on the oil pump rotation speed P_N and the hydraulic oil temperature ATF_T. Note that Cn corresponds to one of the clutches C1, C2, and C3 (the same will apply hereunder).

In step S2, the processing unit 101 of the control apparatus 100 causes the clutch temperature estimation unit 132 to calculate a temperature $Cn\_T$ of each of the clutches C1 to C3 in the current gear range and a predicted raised temperature value $Cn\_\Delta T$ in the gear range after the gear change.

In step S3, the processing unit 101 of the control apparatus 100 causes the clutch cooling rate estimation unit 133 to calculate a clutch cooling rate $Cn\_V$ in the current gear range or the gear range after the gear change from the operation state (a release state, an engaging state, or a guide rotation stop state) of each clutch in the current gear range or the gear range after the gear change, the clutch lubrication amount $Cn\_CL$, and the difference between the clutch temperature $Cn\_T$ and the hydraulic oil temperature $ATF\_T$. Note that the guide rotation stop state is a state in which a guide member configured to move a clutch Cn and switch it to an engaging state or a release state is stopped by the engagement of the brakes B1 to B3 and the like.

In step S4, the processing unit 101 of the control apparatus 100 causes the allowable clutch temperature calculation unit 134 to calculate an allowable clutch temperature $Cn\_Tmax$ in the current gear range or the gear range after the gear change from the clutch cooling rate $Cn\_V$ in the current gear range or the gear range after the gear change.

In step S5, the processing unit 101 of the control apparatus 100 executes gear change control to be described later with reference to FIG. 6 based on a result obtained by comparing the sum of the temperature $Cn\_T$ in the current gear range and the predicted raised temperature value $Cn\_\Delta T$ of the clutch in the gear range after the gear change obtained by the clutch lubrication amount estimation unit 132 with the allowable clutch temperature $C\_Tmax$ in the current gear range or the gear range after the gear change obtained by the allowable clutch temperature calculation unit 134.

<Gear Change Control>

Details of the gear change control in step S5 of FIG. 5 will be described next with reference to FIG. 6.

In step S51, the processing unit 101 of the control apparatus 100 determines whether the clutch that is the target of processing in steps S1 to S4 is a clutch to be engaged in the next gear range based on the velocity diagram of FIG. 3. Upon determining that the clutch is a clutch to be engaged in the next gear range, the processing unit 101 advances to step S52. Upon determining that the clutch is a clutch not to be engaged in the next gear range, the processing unit 101 advances to step S55. Note that a clutch not to be engaged in the next gear range corresponds to, for example, a clutch that is currently engaged and should be released in the next gear range or a clutch that is engaged neither in the current gear range nor in the next gear range.

In step S52, the processing unit 101 of the control apparatus 100 determines whether a post-gear-change temperature value $Cn\_T+Cn\_\Delta T$ obtained by adding the current clutch temperature $Cn\_T$ of the clutch Cn to be engaged in the next gear range and the predicted raised temperature value $Cn\_\Delta T$ in the gear range after the gear change is equal to or more than an allowable clutch temperature $Cn\_T1max$ in the gear range after the gear change. Upon determining that the post-gear-change temperature value $Cn\_T+Cn\_\Delta T$ is equal to or more than the allowable clutch temperature $Cn\_T1max$ in the gear range after the gear change, the processing unit 101 advances to step S54. Upon determining that the post-gear-change temperature value $Cn\_T+Cn\_\Delta T$ is less than the allowable clutch temperature $Cn\_T1max$, the processing unit 101 advances to step S53.

In step S53, since the post-gear-change temperature value $Cn\_T+Cn\_\Delta T$ of the clutch to be engaged in the next gear range is less than the allowable clutch temperature $Cn\_T1max$ in the gear range after the gear change, the processing unit 101 of the control apparatus 100 performs normal gear change control without restricting the gear change of the clutch Cn to the next gear range.

In step S54, since the post-gear-change temperature value $Cn\_T+Cn\_\Delta T$ of the clutch to be engaged in the next gear range is equal to or more than the allowable clutch temperature $Cn\_T1max$ in the gear range after the gear change, and the clutch needs to be protected from heat damage, the processing unit 101 of the control apparatus 100 executes gear change restriction to inhibit the gear change to the next gear range.

In step S55, the processing unit 101 of the control apparatus 100 determines whether the clutch temperature $Cn\_T$ in the current gear range of the clutch Cn not to be engaged in the next gear range is equal to or higher than an allowable clutch temperature $Cn\_T0max$ in the current gear range, and the allowable clutch temperature $Cn\_T1max$ in the gear range after the gear change is equal to or higher than the allowable clutch temperature $Cn\_T0max$ in the current gear range. If the determination condition is satisfied, the processing unit 101 advances to step S59. If the determination condition is not satisfied, the processing unit 101 advances to step S56.

In step S59, even when the clutch temperature $Cn\_T$ in the current gear range is equal to or higher than the allowable clutch temperature $Cn\_T0max$ in the current gear range, if the allowable clutch temperature $Cn\_T1max$ in the gear range after the gear change becomes equal to or higher than the allowable clutch temperature $Cn\_T0max$ in the current gear range, the clutch cooling rate $Cn\_V$ is increased by the gear change. For this reason, the processing unit 101 of the control apparatus 100 forcibly executes the gear change. This can promote cooling of the clutch.

In step S56, the processing unit 101 of the control apparatus 100 determines whether the current clutch temperature $Cn\_T$ of the clutch Cn not to be engaged in the next gear range is equal to or higher than the allowable clutch temperature $Cn\_T1max$ in the gear range after the gear change. Upon determining that the current clutch temperature $Cn\_T$ is equal to or higher than the allowable clutch temperature $Cn\_T1max$ in the gear range after the gear change, the processing unit 101 advances to step S58. Upon determining that the current clutch temperature $Cn\_T$ is lower than the allowable clutch temperature $Cn\_T1max$, the processing unit 101 advances to step S57.

In step S57, since the current clutch temperature $Cn\_T$ is lower than the allowable clutch temperature $Cn\_T1max$ in the gear range after the gear change, the processing unit 101 of the control apparatus 100 performs normal gear change control without restricting the gear change of the clutch Cn to the next gear range.

In step S58, since the clutch is the clutch Cn not to be engaged in the next gear range, heat is not generated beyond the current allowable clutch temperature. However, the clutch cooling rate is reduced by the gear change, and the current clutch temperature $Cn\_T$ is predicted to become equal to or higher than the allowable clutch temperature $Cn\_T1max$ in the gear range after the gear change. Hence, the processing unit 101 of the control apparatus 100 executes gear change restriction to inhibit the gear change to the next gear range. This can prevent the cooling of the clutch from being impeded.

Note that the gear change restriction in step S54 or S58 continues until the sum of the clutch temperature $Cn\_T$ or the predicted raised temperature value $Cn\_\Delta T$ becomes less than the allowable clutch temperature Cn_T1max in the gear range after the gear change. Since the time until the temperature of the clutch becomes equal to or lower than the allowable temperature is very short (2 to 3 sec), the gear change timing is never delayed more than necessary.

As described above, according to the present embodiment, in the automatic transmission 1 that establishes a gear range by the plurality of planetary gear mechanisms P1 to P4, clutch protection control can be executed by obtaining an appropriate allowable clutch temperature at the time of a gear change. It is therefore possible to prevent breakage of a clutch by heat damage or performance deterioration caused by necessary control intervention.

The above-described embodiment is an example for implementing the present invention, and the present invention is applicable to a revision or a modification of the present embodiment without departing from the scope of the present invention. For example, in the present embodiment, gear change control of the clutches C1 to C3 of the planetary gear mechanisms P1 to P4 has been described. However, the present invention is also applicable to gear change control of the brakes B1 to B3. In addition, gear change control according to the present embodiment is applicable to not only a so-called planetary transmission that establishes a gear range by a plurality of planetary gear mechanisms but also a transmission that cannot obtain an allowable clutch temperature suitable for an actual situation from the main shaft rotation speed, like a conventional automatic transmission called 4AT or 5AT in which the input and output shafts (the main shaft and the counter shaft) are arranged in parallel. Furthermore, an engine (internal combustion engine) has been exemplified as a motor. However, the present invention is not limited to this. A hybrid of an engine and a motor may be used, or an electric motor may be used.

Additionally, in the present invention, a computer program corresponding to break-in control according to the above-described embodiment or a storage medium storing the computer program may be supplied to a computer mounted on a vehicle, and the computer may load and execute program codes stored in the storage medium.

<Summary of Embodiment>

(Configuration 1)

There is provided a control apparatus 100 of an automatic transmission 1 including a plurality of planetary gear mechanisms P1 to P4 and engaging mechanisms C1 to C3 configured to establish a gear range by switching inputs/outputs of the plurality of planetary gear mechanisms P1 to P4, characterized by comprising:

an oil pressure supply device 120 configured to supply an oil pressure to operate the engaging mechanisms C1 to C3 between an engaging state and a release state in which the engaging state is canceled; and a gear change controller 101 configured to control an operation state of each of the engaging mechanisms C1 to C3 of the planetary gear mechanisms P1 to P4 to establish one gear range of a plurality of gear ranges, wherein the gear change controller 101 calculates a temperature $C\_T+C\_\Delta T$ of each of the engaging mechanisms C1 to C3 in the gear range after a gear change, calculates a cooling rate C_V of each of the engaging mechanisms C1 to C3 in the gear range after the gear change based on the temperature $C\_T+C\_\Delta T$ and the operation state of each of the engaging mechanisms C1 to C3, calculates an allowable temperature C_Tmax of each of the engaging mechanisms C1 to C3 in the gear range after the gear change based on the cooling rate C_V of each of the engaging mechanisms C1 to C3, and executes gear change control (S54) of controlling the gear change to the gear range in a case in which the temperature $C\_T+C\_\Delta T$ of each of the engaging mechanisms C1 to C3 in the gear range after the gear change is predicted to be not less than the allowable temperature C_Tmax.

According to configuration 1, in the automatic transmission 1 that establishes the gear range by the plurality of planetary gear mechanisms P1 to P4, protection control of the engaging mechanisms can be executed by obtaining the appropriate allowable temperature C_Tmax from the cooling rate C_V estimated from the engaging mechanisms C1 to C3 in the gear range after the gear change. It is therefore possible to prevent breakage of an engaging mechanism by heat damage or performance deterioration caused by necessary control intervention.

(Configuration 2)

In configuration 1, the control apparatus is characterized in that the gear change controller 101 comprises:

a lubrication amount estimation unit 131 configured to estimate a lubrication state quantity C_CL of each of the engaging mechanisms C1 to C3 in each gear range;

a temperature estimation unit 132 configured to estimate the temperature $C\_T+C\_\Delta T$ of each of the engaging mechanisms C1 to C3 in the gear range after the gear change;

a cooling rate estimation unit 133 configured to estimate the cooling rate C_V of each of the engaging mechanisms C1 to C3 in the gear range after the gear change; and an allowable temperature calculation unit 134 configured to calculate the allowable temperature C_Tmax of each of the engaging mechanisms C1 to C3 in the gear range after the gear change.

According to configuration 2, in the automatic transmission 1 that establishes the gear range by the plurality of planetary gear mechanisms P1 to P4, the appropriate allowable temperature C_Tmax can be obtained from the cooling rate C_V estimated from the engaging mechanisms C1 to C3 in the gear range after the gear change.

(Configuration 3)

In configuration 2, the control apparatus is characterized in that the cooling rate estimation unit 133 calculates the cooling rate C_V of each of the engaging mechanisms C1 to C3 based on the lubrication state quantity C_CL of each of the engaging mechanisms C1 to C3 in the gear range after the gear change and the temperature $C\_T+C\_\Delta T$ and the operation state of each of the engaging mechanisms C1 to C3.

According to configuration 3, it is possible to estimate the cooling rate C_V of each of the engaging mechanisms C1 to C3 in the gear range after the gear change and obtain the appropriate allowable clutch temperature C_Tmax.

According to configuration 3, in the automatic transmission 1 that establishes the gear range by the plurality of planetary gear mechanisms P1 to P4, it is possible to obtain the cooling rate C_V of each of the engaging mechanisms C1 to C3 suitable for an actual situation in the gear range after the gear change and obtain the appropriate allowable temperature C_Tmax from the cooling rate C_V.

(Configuration 4)

In configuration 2 or 3, the control apparatus is characterized in that the lubrication amount estimation unit 131 calculates the lubrication state quantity C_CL of each of the engaging mechanisms C1 to C3 in each gear range based on a supply state P_N of hydraulic oil that operates each of the engaging mechanisms C1 to C3, a temperature ATF_T of the hydraulic oil, and an interpolation coefficient according to the oil pressure of the hydraulic oil.

According to configuration 4, in the automatic transmission 1 that establishes the gear range by the plurality of planetary gear mechanisms P1 to P4, it is possible to obtain the cooling rate C_V of each of the engaging mechanisms C1 to C3 suitable for an actual situation in the gear range after the gear change and obtain the appropriate allowable temperature C_Tmax from the cooling rate C_V.

(Configuration 5)

In configuration 2, the control apparatus is characterized in that the cooling rate estimation unit 133 calculates the cooling rate C_V of each of the engaging mechanisms C1 to C3 based on the lubrication state quantity C_CL of each of the engaging mechanisms C1 to C3, a difference between a temperature C_T of each of the engaging mechanisms C1 to C3 and the temperature ATF_T of the hydraulic oil, and the operation state of each of the engaging mechanisms C1 to C3.

According to configuration 5, it is possible to obtain the cooling rate C_V suitable for an actual situation in the gear range after the gear change and obtain the appropriate allowable temperature C_Tmax from the cooling rate C_V.

(Configuration 6)

In any one of configurations 1 to 5, the control apparatus is characterized in that the allowable temperature C_Tmax of each of the engaging mechanisms C1 to C3 has a characteristic that changes depending on the cooling rate C_V of each of the engaging mechanisms C1 to C3.

According to configuration 6, it is possible to appropriately obtain the allowable temperature that changes depending on the cooling rate C_V of each of the engaging mechanisms C1 to C3 in the gear range after the gear change.

According to configuration 6, it is possible to obtain the cooling rate C_V suitable for an actual situation in the gear range after the gear change and obtain the appropriate allowable temperature C_Tmax from the cooling rate C_V.

(Configuration 7)

In any one of configurations 1 to 6, the control apparatus is characterized in that the temperature estimation unit calculates the post-gear-change temperature value Cn_T+Cn_ΔT obtained by adding the temperature C_T of each of the engaging mechanisms C1 to C3 in a current gear range and a predicted raised temperature value C_ΔT of each of the engaging mechanisms C1 to C3 in a next gear range as the temperature of each of the engaging mechanisms C1 to C3 in the gear range after the gear change.

According to configuration 7, in the automatic transmission 1 that establishes the gear range by the plurality of planetary gear mechanisms P1 to P4, it is possible to execute appropriate gear change restriction based on comparison between the temperature C_T of each of the engaging mechanisms C1 to C3 in the gear range after the gear change and the allowable temperature C_Tmax.

(Configuration 8)

In configuration 7, the control apparatus is characterized in that the gear change controller 101 determines whether each of the engaging mechanisms C1 to C3 is to be engaged in the next gear range, for the engaging mechanisms C1 to C3 to be engaged in the next gear range, executes the gear change control in a case in which the post-gear-change temperature value C_T+C_ΔT is not less than an allowable temperature C_T1max of the engaging mechanisms C1 to C3 in the gear range after the gear change, and for the engaging mechanisms C1 to C3 not to be engaged in the next gear range, forcibly executes the gear change (S59) in a case in which the temperature C_T of the engaging mechanisms C1 to C3 in the current gear range is not less than an allowable temperature C_T0max in the current gear range, and the allowable temperature C_T1max in the gear range after the gear change is not less than the allowable temperature C_T0max in the current gear range.

According to configuration 8, when the gear change is performed, the cooling rate C_V of each of the engaging mechanisms C1 to C3 increases. Hence, cooling of the engaging mechanisms C1 to C3 can be promoted.

(Configuration 9)

In configuration 8, the control apparatus is characterized in that in a case in which the temperature C_T of not the engaging mechanism of the engaging mechanisms C1 to C3, which is to be engaged in the next gear range, but the engaging mechanisms C1 to C3 in the current gear range is less than the allowable temperature C_T0max in the current gear range, or in a case in which the allowable temperature C_T1max in the gear range after the gear change is less than the allowable temperature C_T0max in the current gear range, the gear change controller 101 executes the gear change control (S58) in the case in which the temperature C_T of the engaging mechanisms C1 to C3 in the current gear range is not less than the allowable temperature C_T1max in the gear range after the gear change.

According to configuration 9, if it is predicted that when the gear change is performed, the cooling rate C_V of each of the engaging mechanisms C1 to C3 lowers, and the current temperature C_T of the engaging mechanisms C1 to C3 becomes not less than the allowable temperature C_T1max in the gear range after the gear change, the gear change restriction is executed, thereby preventing the cooling of the clutch from being impeded.

(Configuration 10)

There is provided a control method of an automatic transmission 1 including:

a plurality of planetary gear mechanisms P1 to P4 and engaging mechanisms C1 to C3 configured to establish a gear range by switching inputs/outputs of the plurality of planetary gear mechanisms P1 to P4;

an oil pressure supply device 120 configured to supply an oil pressure to operate the engaging mechanisms C1 to C3 between an engaging state and a release state in which the engaging state is canceled; and a gear change controller 101 configured to control an operation state of each of the engaging mechanisms C1 to C3 of the planetary gear mechanisms P1 to P4 to establish one gear range of a plurality of gear ranges, the method characterized by comprising:

calculating a temperature of each of the engaging mechanisms C1 to C3 in the gear range after a gear change (S2);

calculating a cooling rate C_V of each of the engaging mechanisms C1 to C3 in the gear range after the gear change based on the temperature and the operation state of each of the engaging mechanisms C1 to C3 (S3);

calculating an allowable temperature C_Tmax of each of the engaging mechanisms C1 to C3 in the gear range after the gear change based on the cooling rate C_V of each of the engaging mechanisms C1 to C3 (S4); and executing gear change control of restricting the gear change to the gear range in a case in which the temperature of each of the engaging mechanisms C1 to C3 in the gear range after the gear change is predicted to be not less than the allowable temperature C_Tmax (S5, S54).

According to configuration 10, in the automatic transmission 1 that establishes the gear range by the plurality of planetary gear mechanisms P1 to P4, clutch protection control can be executed by obtaining the appropriate allowable clutch temperature C_Tmax from the cooling rate C_V estimated from the engaging mechanisms C1 to C3 in the gear range after the gear change. It is therefore possible to prevent breakage of a clutch by heat damage or performance deterioration caused by necessary control intervention.

What is claimed is:

1. A control apparatus of an automatic transmission including a plurality of planetary gear mechanisms and engaging mechanisms configured to establish a gear range by switching inputs/outputs of the plurality of planetary gear mechanisms, comprising:
   an oil pressure supply device configured to supply an oil pressure to operate the engaging mechanisms between an engaging state and a release state in which the engaging state is canceled; and
   a gear change controller configured to control an operation state of each of the engaging mechanisms of the planetary gear mechanisms to establish one gear range of a plurality of gear ranges,
   wherein the gear change controller calculates a temperature of each of the engaging mechanisms in the gear range after a gear change,
   calculates a cooling rate of each of the engaging mechanisms in the gear range after the gear change based on the temperature and the operation state of each of the engaging mechanisms,
   calculates an allowable temperature of each of the engaging mechanisms in the gear range after the gear change based on the cooling rate of each of the engaging mechanisms, and
   executes gear change control of restricting the gear change to the gear range in a case in which the temperature of each of the engaging mechanisms in the gear range after the gear change is predicted to be not less than the allowable temperature.

2. The apparatus according to claim 1, wherein a memory and a processor function as the following units of the gear change controller:
   a lubrication amount estimation unit configured to estimating a lubrication state quantity of each of the engaging mechanisms in each gear range;
   a temperature estimation unit configured to estimating the temperature of each of the engaging mechanisms in the gear range after the gear change;
   a cooling rate estimation unit configured to estimating the cooling rate of each of the engaging mechanisms in the gear range after the gear change; and
   an allowable temperature calculation unit configured to calculating the allowable temperature of each of the engaging mechanisms in the gear range after the gear change.

3. The apparatus according to claim 2, wherein the cooling rate estimation unit calculates the cooling rate of each of the engaging mechanisms based on the lubrication state quantity of each of the engaging mechanisms in the gear range after the gear change and the temperature and the operation state of each of the engaging mechanisms.

4. The apparatus according to claim 2, wherein the lubrication amount estimation unit calculates the lubrication state quantity of each of the engaging mechanisms in each gear range based on a supply state of hydraulic oil that operates each of the engaging mechanisms, a temperature of the hydraulic oil, and an interpolation coefficient according to the oil pressure of the hydraulic oil.

5. The apparatus according to claim 4, wherein the cooling rate estimation unit calculates the cooling rate of each of the engaging mechanisms based on the lubrication state quantity of each of the engaging mechanisms, a difference between a temperature of each of the engaging mechanisms and the temperature of the hydraulic oil, and the operation state of each of the engaging mechanisms.

6. The apparatus according to claim 2, wherein the temperature estimation unit calculates the post-gear-change temperature value obtained by adding the temperature of each of the engaging mechanisms in a current gear range and a predicted raised temperature value of each of the engaging mechanisms in a next gear range as the temperature of each of the engaging mechanisms in the gear range after the gear change.

7. The apparatus according to claim 6, wherein the gear change controller determines whether each of the engaging mechanisms is to be engaged in the next gear range,
   for the engaging mechanisms to be engaged in the next gear range, executes the gear change control in a case in which the post-gear-change temperature value is not less than an allowable temperature of the engaging mechanisms in the gear range after the gear change, and
   for the engaging mechanisms not to be engaged in the next gear range, forcibly executes the gear change in a case in which the temperature of the engaging mechanisms in the current gear range is not less than an allowable temperature in the current gear range, and the allowable temperature in the gear range after the gear change is not less than the allowable temperature in the current gear range.

8. The apparatus according to claim 7, wherein in a case in which the temperature of not the engaging mechanism of the engaging mechanisms, which is to be engaged in the next gear range, but the engaging mechanisms in the current gear range is less than the allowable temperature in the current gear range, or in a case in which the allowable temperature in the gear range after the gear change is less than the allowable temperature in the current gear range, the gear change controller executes the gear change control in the case in which the temperature of the engaging mechanisms in the current gear range is not less than the allowable temperature in the gear range after the gear change.

9. The apparatus according to claim 1, wherein the allowable temperature of each of the engaging mechanisms has a characteristic that changes depending on the cooling rate of each of the engaging mechanisms.

10. A control method of an automatic transmission including:
    a plurality of planetary gear mechanisms and engaging mechanisms configured to establish a gear range by switching inputs/outputs of the plurality of planetary gear mechanisms;
    an oil pressure supply device configured to supplying an oil pressure to operate the engaging mechanisms between an engaging state and a release state in which the engaging state is canceled; and
    a gear change controller configured to control an operation state of each of the engaging mechanisms of the planetary gear mechanisms to establish one gear range of a plurality of gear ranges, the method comprising:
    calculating a temperature of each of the engaging mechanisms in the gear range after a gear change;

calculating a cooling rate of each of the engaging mechanisms in the gear range after the gear change based on the temperature and the operation state of each of the engaging mechanisms;

calculating an allowable temperature of each of the engaging mechanisms in the gear range after the gear change based on the cooling rate of each of the engaging mechanisms; and executing gear change control of controlling the gear change to the gear range in a case in which the temperature of each of the engaging mechanisms in the gear range after the gear change is predicted to be not less than the allowable temperature.

* * * * *